(12) United States Patent
Ohmayer et al.

(10) Patent No.: US 7,640,801 B2
(45) Date of Patent: Jan. 5, 2010

(54) ELECTRONICS INSERT ARRANGEMENT FOR A MEASURING DEVICE HOUSING

(75) Inventors: Gerd Ohmayer, Haslach i.K. (DE); Holger Staiger, Lauterbach (DE); Thomas Deck, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 389 days.

(21) Appl. No.: 11/610,689

(22) Filed: Dec. 14, 2006

(65) Prior Publication Data
US 2007/0175265 A1   Aug. 2, 2007

Related U.S. Application Data

(60) Provisional application No. 60/754,527, filed on Dec. 27, 2005.

(30) Foreign Application Priority Data
Dec. 27, 2005   (DE)   ........................ 10 2005 062 420

(51) Int. Cl.
*G01L 19/14* (2006.01)
(52) U.S. Cl. ...................... 73/431; 73/290 R
(58) Field of Classification Search ............... 73/290 R, 73/431
See application file for complete search history.

(56) References Cited

U.S. PATENT DOCUMENTS 6,539,819 B1 *   4/2003   Dreyer et al.   ..............   73/866.1

2005/0116722 A1   6/2005   Wolter
2005/0272319 A1   12/2005   Scmidt et al.

FOREIGN PATENT DOCUMENTS

| DE | 3743446 | 7/1989 |
|---|---|---|
| DE | 9014135.0 | 2/1991 |
| DE | 4005086 | 8/1991 |
| DE | 29723178 | 6/1998 |
| DE | 200 05 084 | 8/2001 |
| DE | 20111830 | 12/2001 |
| DE | 10061854 | 7/2002 |
| DE | 10146093 | 4/2003 |
| DE | 10161768 | 6/2003 |
| EP | 1 538 425 | 6/2005 |
| WO | 2004 026013 | 3/2004 |

* cited by examiner

*Primary Examiner*—Hezron Williams
*Assistant Examiner*—Rodney T Frank
(74) *Attorney, Agent, or Firm*—Fay Kaplun & Marcin, LLP

(57) ABSTRACT

An electronics insert arrangement for a measuring device includes an electronics insert and an electronics module. The electronics insert includes a first attachment device and a first interface. The electronics module includes a second attachment device and a second interface. For coupling the electronics module to the electronics insert, the first attachment device and the second attachment device can be brought to engage each other such that a space between the first interface and the second interface remains essentially constant when the electronics insert moves. The electronics insert is equipped to carry out processes of a first functionality, and the electronics module is equipped to carry out processes of a second functionality.

30 Claims, 7 Drawing Sheets

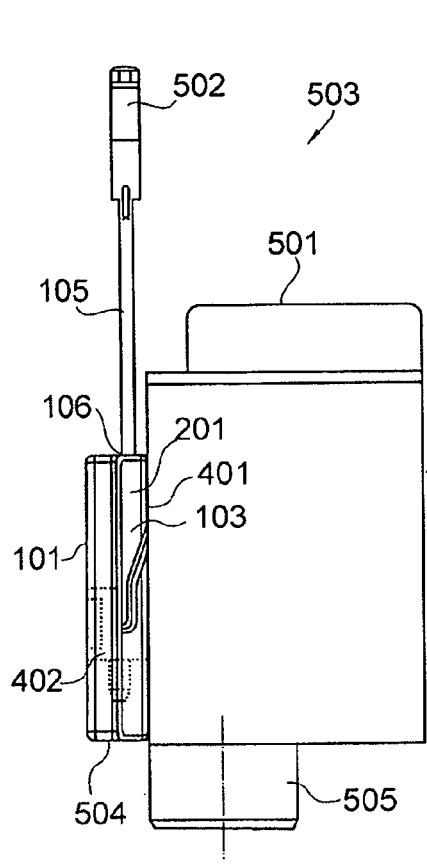
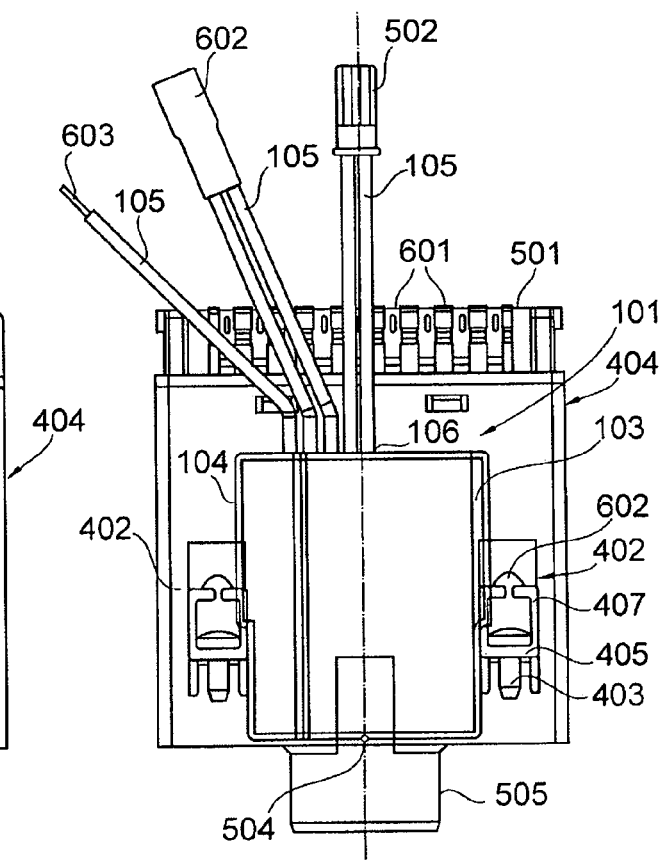
Fig. 5    Fig. 6
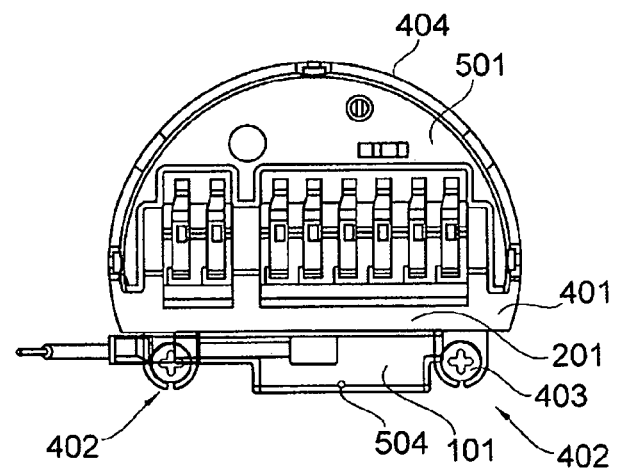
Fig. 7

ELECTRONICS INSERT ARRANGEMENT FOR A MEASURING DEVICE HOUSING

REFERENCE TO RELATED APPLICATIONS

This application claims the benefit of the filing date of German Patent Application Serial No. 10 2005 062 420.0 filed Dec. 27, 2005 and U.S. Provisional Patent Application Ser. No. 60/754,527 filed Dec. 27, 2005, the disclosure of which applications is hereby incorporated herein by reference.

FIELD OF THE INVENTION

The present invention relates to a measuring device housing. In particular the present invention relates to an electronics insert arrangement for a measuring device housing, to an electronics insert for a measuring device housing, to an electronics module for a measuring device housing, and to a measuring device comprising an electronics insert arrangement.

TECHNOLOGICAL BACKGROUND

Series production of measuring devices, in particular of fill level measuring devices and pressure measuring devices, may be facilitated in that as many parts and components as possible of the measuring devices are standardised. This may apply above all to the functions that are responsible for the actual measuring task. This arrangement can involve an electronic measuring circuit with corresponding programs.

However, it may happen that upon special request by a customer additional functions may have to be provided for a standard measuring device. These individual adaptations are often necessary for only a few measuring devices. However, often, additional modules may have to be developed to carry out the additional functions.

Since these additional modules also require additional installation space, these additional modules have hitherto been accommodated loosely, i.e. depending on available space, in whatever cavities there are in the housing of the measuring device between the main module and the housing wall. Often the main modules are accommodated in an electronics insert or an electronics can, firmly seated in the measuring device housing.

However, in this arrangement, due to their non-fixed accommodation, the additional modules are accommodated, differently in each device, in a void between the electronics can and the housing wall of the measuring device. However, the additional modules may also be installed in an overhead installation of the measuring device. Apart from the lack of fixed-position installation of the additional module, this arrangement may also fail to provide any measures that provide protection against vibration or shaking. Consequently the position of the additional modules in the housing can change, so that the additional modules in the measuring device housing can move, depending on the mechanical loads acting on them. As a result of this the additional components or additional electronics may collide with other movable components that project into the housing space, and in some circumstances may even jam such components.

Moreover, due to their lack of fixed-position accommodation, the additional components or additional electronics may be differently accommodated in the void between the electronics can and the measuring housing wall, which may make a uniform and standardisable design impossible.

Apart from the lose and random accommodation in voids in the measuring device housing, additional components are nowadays often attached to movable lines with the use of cable ties, or they are non-detachably affixed using adhesive. However, other components can be changed as a result of this type of affixation.

SUMMARY OF THE INVENTION

According to exemplary embodiments of the present invention, an electronics insert arrangement for a measuring device, an electronics insert, an electronics module, and a measuring device with an electronics insert arrangement with the characteristics according to the independent claims are provided.

According to an exemplary embodiment of the present invention, an electronics insert arrangement for a measuring device housing with an electronics insert and an electronics module is provided. The electronics insert comprises a first attachment device and a first interface, while the electronics module comprises a second attachment device and a second interface. If the electronics module is connected to the electronics insert, the first attachment device and the second attachment device can be brought to engage each other such that a space, which the first interface maintains from the second interface in their installed states, remains essentially constant when the electronics insert moves. The electronics insert, in particular a module accommodated by it, is equipped to carry out processes of a first functionality, while the electronics module, in particular a module accommodated by it, is equipped to carry out processes of a second functionality.

This may provide reliable attachment of an additional module in a measuring device.

According to a further exemplary embodiment of the present invention, an electronics insert for a measuring device housing is provided, which electronics insert is equipped to carry out processes of a first functionality, and comprises a first attachment device. This first attachment device is designed such that the first attachment device can be coupled to a second attachment device of an electronics module. Furthermore, the electronics insert comprises a first interface, wherein the first interface in a coupled state of the electronics insert with the electronics module comprises a space from a second interface of the electronics module. This space between the first interface and the second interface remains essentially constant during movement of the electronics insert.

Furthermore, according to another exemplary embodiment of the present invention, an electronics module for a measuring device housing is provided, wherein the electronics module is designed to carry out processes of a second functionality, and wherein the electronics module comprises a second attachment device. The second attachment device can be coupled to a first attachment device of an electronics insert. Furthermore, the electronics module comprises a second interface, wherein the second interface in its coupled state comprises a space from a first interface of the electronics insert. The space between the second interface and the first interface remains essentially constant during movement of the electronics insert.

According to another exemplary embodiment of the present invention, a measuring device with an electronics insert arrangement is provided. In this setup the electronics insert arrangement comprises the above-mentioned characteristics.

An electronics insert may be a standard module for providing measuring-device-specific functions. As a result of the modularised design of a measuring device, in particular of a pressure measuring device and/or a fill level measuring device, installation of the measuring device may be simplified. For the construction of the measuring device, a standard housing type may be provided that can accommodate inserts that depend on the measuring device type. This measuring-device-specific insert in the standard housing may be equipped for providing and evaluating the measured variable, for which the measuring device is designed. For example, the electronics insert may be equipped to carry out pressure measuring or fill level measuring.

A module or conductor module with corresponding control software, which is designed for measuring fill levels, can differ from a module that is specialised for measuring pressures. Therefore the functionalities of different electronics inserts can be different from each other.

It may also be possible to differentiate between electronics inserts according to the way in which they pick up the corresponding measured variables. Fill levels can, for example, be determined by means of radar pulses, high frequency, ultrasound, or capacitive means. Consequently, the functionalities implemented may differ from those of electronics inserts that are designed for determining the same measuring type.

Furthermore, an electronics insert may be provided for connection to a measuring device bus. Examples of measuring buses include the HART® bus, in particular implemented in two-wire or four-wire technique, the VBUS, the field bus foundation bus or the Profibus. The standard electronic insert provided for the corresponding bus type may differ in relation to the interfaces, such as connecting terminals, provided on the electronics inserts.

In other words, the functionality of various electronics inserts may differ depending on the measuring functions implemented with them. However, the external dimensions of the housings, which are for example made of plastic, may essentially be identical. The electronics inserts can however comprise corresponding interfaces to provide different connections.

If additional functionalities apart from those of the electronics inserts are to be implemented, additional modules may be necessary, which modules expand the basic functionality of the corresponding electronics insert. For example, display illumination or display heating may be a required additional functionality. The additional functionalities may differ from the functionalities of the electronics insert. Consequently, the processes of the electronics insert functionality may be entirely different from the processes of the additional module functionality.

Additional space in the measuring device housing may be required for the additional modules. If the additional components, additional electronics or additional modules are provided in an electronics module as an expansion module, second attachment devices on the electronics module can be designed such that they can be made to engage first attachment devices of the electronics insert or of the electronics can. In this way the electronics module may be coupled to the electronics insert. Relative movement between the electronics insert and the electronics module may be prevented by coupling by means of the first and the second attachment device.

The electronics insert can comprise a housing that can accommodate a conductor module for implementing the processes of the first functionality. The electronics module can also comprise a housing that can accommodate components or conductor modules or electronics prints which implement the processes of the second functionality.

Furthermore, it may be necessary to exchange information or performance between the electronics insert and the electronics module. For the exchange of information or performance, connection lines that can be connected to the electronics insert and to the electronics module may be used. The connection lines can be connected to interfaces that can form part of the electronics insert or the electronics module.

The electronics insert, in particular the housing of the electronics insert, can comprise a first interface, through which a connection line can lead from the electronics module to a conductor module of the electronics insert. The electronics module, too, in particular the housing of the electronics module, can comprise an interface through which a connection line can lead from the electronics insert to a conductor module of the electronics module.

This interface can also, for example, be designed as a clamp-type connection for connection lines. For example, the HART® protocol may provide for the associated bus to be designed in the form of a two-wire line or a four-wire line. In the case of the two-wire technique, two interface connections can be provided, while in the case of the four-wire technique, four connections can be provided.

If communication between the additional functions of an electronics module is to take place with the functionalities of the electronics insert, this communication can take place by way of the connection lines. The connection lines connect the electronics module with the electronics insert. Connection of the connection line to the respective component on the respective modules can take place by way of soldered connections or plug-type connections. If the electronics module is affixed loosely in the measuring device housing, due to the inertia of the electronics module, said electronics module can be displaced within the housing as a result of external mechanical influences such as shaking or shocks.

If the electronics module is only attached to the electronics insert by means of connection lines, and if the electronics insert is attached to the measuring device housing, in the case of movement of the electronics insert, relative movement between the electronics module and the electronics insert may occur. As a result of this the space of an interface of the electronics module from an interface of the electronics insert may change.

Consequently the electronics module may exert a tensile force on the connection line so that the connection line is moved from its attachment. This may in turn result in contact deficiencies and defects occurring in the measuring device or in the additional function of the measuring device, which additional function is provided by way of the electronics module.

By means of attachment of the electronics module to the electronics insert, relative movement of the electronics module in relation to the electronics insert may be prevented. The electronics module may follow movement of the electronics insert.

Due to creeping of the electronics module it may also be possible for chafing on other components that project into the interior of the measuring device housing to occur. Chafing of the electronics module on other components may also be prevented by fixed position installation on the electronics insert in the interior of the measuring device housing, in the same way as jamming against other components can be prevented.

Changes in the position in the case of overhead installation may also be prevented.

Below, further exemplary embodiments of the electronics insert arrangement are described. These exemplary embodiments and designs also apply to the electronics insert, to the electronics module and to the measuring device comprising an electronics insert arrangement.

According to a further exemplary embodiment of the present invention, an electronics insert arrangement is stated, wherein the space between the first interface of the electronics insert and the second interface of the electronics module remains essentially constant during vibration.

Vibrations can be mechanical loads that can occur, in particular, during measuring carried out on moving objects. Most of the time vibration only gives rise to small forces, but the regular occurrence of these forces may result in loads that can have an effect, in particular, on plugged-in connections. Over an extended period of time, clamping connections may become undone due to vibration. Vibration-proof attachment, in which a first attachment device engages a second attachment device in a vibration-proof manner, can prevent relative movement of the electronics module in relation to the electronics insert in the case of vibrations. Consequently, loads arising as a result of vibration may be kept away from connection lines.

According to a further exemplary embodiment of the present invention the first attachment device and the second attachment device can be made to engage each other without the use of tools.

In the case of repair work, in particular in the case of expanding functionalities of measuring devices, it may be necessary for the measuring device housing to be opened and the electronics module to be dismantled in order to be able to access the interior of the measuring device housing. A modular design may prevent the need for complicated handling of tools during deinstallation and reinstallation of a measuring device. Often, special tools are required in order to be able to deinstall parts. If a coupling, in particular a connected attachment by means of the first attachment device and the second attachment device, can be opened or closed without any tools, then installation of an electronics module may be accelerated.

According to a further exemplary embodiment of the present invention, the electronics insert comprises a first plane surface, and the electronics module comprises a second plane surface. In an operational state in which the first attachment device and the second attachment device are in mutual engagement, the first plane surface and the second plane surface come to rest essentially flat against each other.

Since the frictional force which two bodies that rest one against the other exert is greater the larger the area of the surfaces resting against each other or contacting each other, it may be useful for securing a position or for improving vibration resistance if the largest-possible plane surface is used as a support surface of an electronics module on or at an electronics insert.

According to a further exemplary embodiment of the present invention, the first attachment device and the second attachment device are clamp-type connections or snap-in connections.

A clamp-type connection can use a frictional force between two communicating attachment devices in order to hold two communicating parts together. In this arrangement, for example springs or the effect of sprung components can be used in order to increase the contact pressure so as to, in this way, increasing the strength of the attachment.

In the case of snap-in connections, specially adapted hook connections are used which may make possible simple snap-in while they may essentially prevent the connection from becoming undone. A barb is just one example of a snap-in connection.

According to a further exemplary embodiment of the present invention, the first attachment device is designed as an injection-moulded retainer.

Since the electronics insert can be a standard component which in itself, due to the modularity of the components, comprises certain add-on components, production of the electronics insert may be simplified if an already existing injection-moulded retainer is used for attaching the electronics module, so as to attach the electronics module to the electronics insert. The second attachment device of the electronics module can be designed such that it can snap-into or clamp onto an injection-moulded geometric shape that is present on all electronics cans or electronics inserts.

In other words, this means that, for example, an electronics insert can comprise a screw retainer for attachment of the electronics insert in the measuring device housing by means of a screw. By way of the design of the second attachment device of the electronics module this screw retainer can be used in such a way that the attachment device, apart from its actual function of providing attachment of the electronics insert to the measuring device housing, is used for attaching the electronics module to the electronics insert.

According to yet another exemplary embodiment of the present invention, the first attachment device is a rail retainer, wherein the second attachment device is designed as a guide rail. The guide rail and the rail retainer can be made to engage each other.

During engagement of the guide rail and the rail retainer, frictional forces may arise that can hold the guide rail in the rail retainer in a fixed position. As a result of the special design of this rail guide system, additional support may be provided, for example with the additional use of a snap-in connection. It may thus be possible to ensure reliable fixed-position installation of the electronics module.

According to a further exemplary embodiment of the present invention, the first attachment device is designed such that the electronics insert can be attached to the measuring device housing by means of the second attachment device. For example, the first attachment device can be a screw retainer for attaching the electronics insert to the measuring device housing.

According to a further exemplary embodiment of the present invention, the first attachment device is a screw retainer. In this arrangement the screw retainer can be a geometric shape that has been injection-moulded to the electronics insert.

According to a further exemplary embodiment of the present invention, the electronics module is designed to accommodate an electronics print.

Due to the associated electronics print or the associated additional module, the electronics module can carry out additional functions. To this effect the electronics module can, for example, provide a fixed hollow region in which an electronics print can be installed.

According to a further exemplary embodiment of the present invention, the electronics module comprises a housing.

By means of a housing an expansion module or an electronics module may be standardised. The housing, in particular the external shape of the housing, and furthermore in particular the second attachment device of the housing of an electronics module, can be designed for attachment to the first attachment device of an electronics insert. In this arrangement the housing of an electronics module can provide a defined space, into which, for example, a module or component can be placed in addition. By means of standardisation of the electronics module housing an electronics insert arrangement can also be designed as a modular system irrespective of the additional functionalities to be implemented.

According to a further exemplary embodiment of the present invention the electronics module is designed as a cast element.

In this arrangement the external shape of the cast element can match the first attachment device of an electronics insert such that the cast element is attachable to the electronics insert. When casting a module with a resin or plastic the individual shape of a module or of a module frame can be taken into account and the module frame can match the shape of the first attachment device.

In particular, the module can comprise a second attachment device and in this way can match the first attachment device. Furthermore, cast components can be secured against movement. The cast material can be used to increase the coefficient of friction of the plane surfaces of the electronics module and of the electronics insert against each other, thus contributing to an increase in the reliability of the fixed-position attachment.

According to a further exemplary embodiment of the present invention, the electronics module comprises an EMC filter (German: EMV-Filter).

Using the electronics insert in an EMC-loaded environment may, for example, result in the components in the interior of the electronics of the electronics insert being interfered with or destroyed as a result of line-bound EMC interference. Destruction of the components may be prevented by means of an EMC filter located in the electronics module. Conversely, as a result of the EMC filter, line-bound interference generated in the electronics insert may not leave the measuring device housing.

In other words this means that external feed lines, for example inlets that can lead from a measuring bus or a power supply to the electronics insert, should in particular be connected to modules in the electronics insert. Before they are terminated on the electronics insert, these lines can be fed to the electronics module that comprises an EMC filter. The EMC filter can thus be coupled or connected in series between the external lines and the electronics insert, thus clearing any interference.

In this context the term "external" refers to a line extending at least partially outside a measuring device housing, sensor housing or field device housing. Consequently the line can be subjected to external interference and the line could lead the interference to the electronics insert.

The electronics module may thus be equipped as a preliminary filter for the electronics insert so as to protect the electronics insert. The EMC filter in or on the electronics module can be designed such that interference or interfering influences that are caused as a result of electromagnetic interactions, in particular in the external lines, may be removed outside the electronics insert and essentially may not reach the electronics insert. Such interference can, for example, be experienced in close proximity of an induction furnace. The EMC filter may consequently decouple the electronics insert from the external lines.

According to a further exemplary embodiment of the present invention, the electronics module comprises a connection line, wherein the connection line is designed such that a first interface is connectable to a second interface.

The information exchange or energy exchange between the electronics insert and the electronics module may take place by means of the connection line, wherein for contacting an electronics module in the electronics insert or an electronics group in the electronics module, the connection line may lead by way of the interface into the interior of the electronics insert or of the electronics module. By means of the connection line a connection between the electronics module and the electronics insert may be established.

According to yet another exemplary embodiment of the present invention, the electronics module is equipped for processing a 4 to 20 mA signal.

In measurement technology, 4 to 20 mA current signals are used not only for transmitting measured information but also for transmitting power or energy. Consequently it may happen that 4 to 20 mA signals are also exchanged between the electronics insert and the electronics module.

According to a further exemplary embodiment of the present invention, the electronics insert can be equipped for carrying out a measuring functionality. For example, the electronics insert can be an electronics insert for carrying out measurements by means of a fill level sensor or a pressure sensor. The electronics insert can provide measuring results obtained during measuring.

According to a further exemplary embodiment of the present invention, the electronics module can be equipped to carry out a display functionality.

A display functionality can be an additional function that differs from the measuring functionality. Consequently it may be necessary to use additional modules that can be accommodated in an external electronics module. An electronics module for carrying out a display functionality, in particular display illumination, may be expanded irrespective of the measuring function.

According to a further exemplary embodiment of the present invention, the electronics module is equipped to carry out a heating functionality.

In particular, a heating functionality can involve heating of a display so that the display may be more easily read. The heating functionality may take place by means of additional modules and can thus be used in an expansion module in addition to the electronics module.

According to yet another exemplary embodiment of the present invention, the measuring device in which the electronics insert arrangement is used is either a pressure measuring device or a fill level measuring device.

An aspect of the present invention provides for additional components or additional electronics to be attached to a standardised electronics can or electronics insert by way of a clamping connection and/or a snap-in connection. In other words, in each measuring device the additional components or additional electronics may be located in the same position even across large numbers. As a result of the clamping connection and/or the snap-in connection the additional components or additional electronics are connected in a vibration-resistant manner to the electronics can and thus to the measuring device. The additional components or additional electronics may also be unable to change their position in the housing of the measuring device for example as a result of overhead installation.

Instead of loosely fastening an electronics module, the electronics module can be fastened to a standardised plastic electronics can in that on the plastic electronics can injection-moulded retainers, pins, etc. can be used as a retainer for a standardised snap-in-clamping connection. For example, plastic cast or injection-moulded components or extrusion coated electronics prints can be used, wherein the fixed or flexible cast of these components can comprise external contours that match the geometric shapes present on the electronics cans, or that click into the injection-moulded geometric shapes.

For example, screw retainers of the attachment of the electronics-can can be used in the housing without wasting space in such a way that the screws for attachment of the can in the housing can no longer be reached. In other words, already before the electronics can is inserted in the measuring device housing, the additional components or additional electronics may be snapped onto the standardised electronics housing, by way of the clamp-type snap-in connection, in the manner of a backpack. In a single work step the complete unit can be inserted in the housing, and subsequent undefined placement of an additional component in an existing void can be prevented. This may also obviate the need for "fiddling around".

The principle of casting may also make it possible to cast several required additional components in this cast and to snap or clamp them as a unit, e.g. as a backpack or an electronics module, to the electronics can. Instead of casting, even without casting a further housing may be provided, whose external contours comprise the corresponding geometric snap-in shapes in order to be able to be attached to the electronics can. In the void of the additional housing with the outside contour, the components, electronics or electronic prints can be accommodated.

Below, exemplary embodiments of the present invention are described with reference to the figures.

BRIEF DESCRIPTION OF DRAWINGS

FIG. 5 shows a lateral view of an electronics insert arrangement according to an exemplary embodiment of the present invention.

FIG. 6 shows a front view of an electronics insert arrangement according to an exemplary embodiment of the present invention.

FIG. 7 shows a top view of an electronics insert arrangement according to an exemplary embodiment of the present invention.

DETAILED DESCRIPTION

Figure 1:
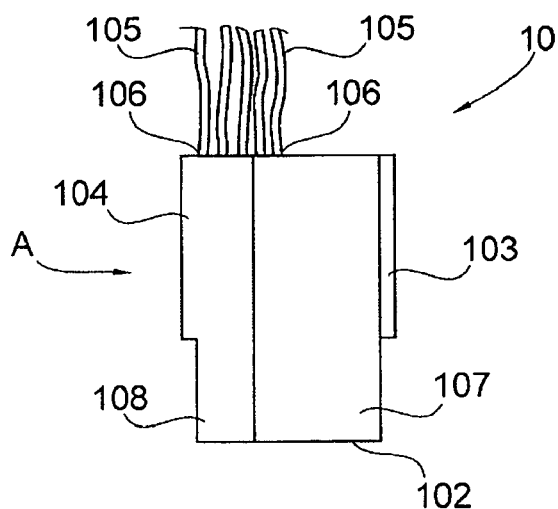
FIG. 1 shows a top view of an electronics module according to an exemplary embodiment of the present invention.

The illustrations in the figures are diagrammatic and not to scale. In the following description of FIGS. 1 to 12, the same reference characters may be used for identical or corresponding elements.

I2C or $I^2C$ (integrated circuit) is a serial bus for computer systems. It can be used for connecting devices with low transmission speeds to an embedded system or to a main printed circuit board.

The HART® protocol (highway addressable remote transmitter) can, in particular, be designated an open master slave protocol for bus-addressable field devices. It can implement a method of transmitting data by means of frequency shift keying (FSK) superimposed on the 4 to 20 mA process signal in order to make it possible to carry out remote configuration and diagnostic tests. It can be implemented both as a two-wire bus with an integrated voltage supply, or a four-wire bus with a separate voltage supply.

Both I2C and HART® are suitable as protocols for communication with a field device, e.g. with a liquid-measuring device or with a pressure measuring device.

FIG. 1 shows a top view of an electronics module according to an exemplary embodiment of the present invention. FIG. 1 shows an electronics module 101 that comprises an essentially rectangular shape, each with two longer parallel sides and two shorter parallel sides. The electronics module 101 comprises a module body 102 and a right-hand guide rail 103 and a left-hand guide rail 104 on its longitudinal sides.

The guide rails 103 and 104 finish flush with one of the shorter sides of the electronics module 101 and extend parallel in relation to the two longer sides of equal length, along approximately three quarters of the length of the two longer sides. Consequently the electronics module 101 is T-shaped.

The module body 102 is divided into the two partial regions 108 and 107. The partial region 107, protruding from the drawing plane, is higher than the partial region 108. The partial region 107 thus encloses a larger volume than the partial region 108 so that the partial region 107 can accommodate larger components than the partial region 108.

The housing body 102 comprises five interfaces 106 through which the connection lines 105 can reach the interior of the housing body 102, in particular a module located in the housing body 102. As an alternative the interfaces 106 can be designed as connecting terminals to which the connection lines 105 can be attached.

Figure 2:
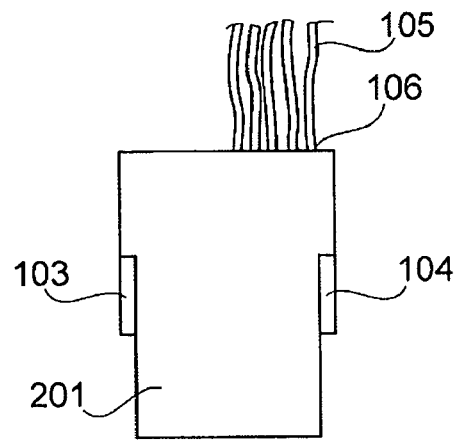
FIG. 2 shows a bottom view of an electronics module according to an exemplary embodiment of the present invention.

FIG. 2 shows a bottom view of an electronics module according to an exemplary embodiment of the present invention. FIG. 2 shows that the guide rails 103 and 104 comprise a contour, as a result of which they are designed as a clam-type connection. The plane surface 201 extends at least partly along the guide rail 103 and 104. From approximately half of the length of the guide rails 103 and 104, the rail bodies 103 and 104 are no longer made of solid material and thus no longer form part of the plane surface 201.

Figure 3:
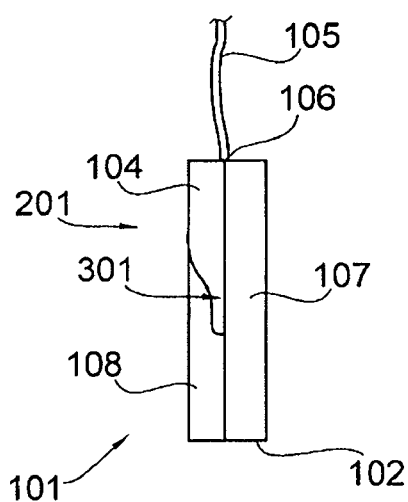
FIG. 3 shows a lateral view of an electronics module according to an exemplary embodiment of the present invention.

FIG. 3 shows a lateral view of an electronics module according to an exemplary embodiment of the present invention. FIG. 3 shows a top view of one side of the electronics module 101 in the direction of view A of FIG. 1. The housing body 102 is rectangular in shape also in lateral view. The diagram shows that the height of the lateral region 107 exceeds the height of the lateral region 108. The diagram further shows that the plane surface 201 extends only along a partial region of the guide rail 104. In this arrangement the guide rail 104 is bottle shaped. Consequently an end region 301 of the guide rail 104 is formed that does not extend all the way to the plane surface 201. As a result of the bottle shape, the guide rail 104 matches the geometric shape of a rail retainer. Moreover, if pressure is exerted in the direction of the plane surface 201, the end piece 301 can easily yield, and, by means of a spring force generated in this way, can exert corresponding counterpressure. The interface 106 is arranged at the height of the edge of the guide rail 104, which edge faces the plane surface 201.

Figure 4:
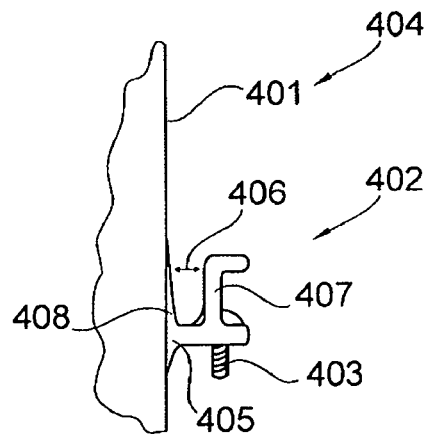
FIG. 4 shows a partial view of an attachment device of an electronics insert according to an exemplary embodiment of the present invention.

FIG. 4 shows a partial view of an attachment device of an electronics insert. The diagram shows the plane surface 401 of the electronics insert with the injection-moulded part 402. The injection-moulded part 402 is a screw retainer for the attachment screw 403. By means of the attachment device 402 or the injection-moulded part 402 the electronics insert 404 is attached to a measuring device housing (not shown in FIG. 4).

The attachment device 402 comprises a vertical flange 405 that is arranged at a right angle on the plane surface 401. In a foot region of the vertical flange 405 there is a projection 408. At a distance 406, parallel to the plane surface 401, a further flange 407 extends. Between the projection 408 and the attachment flange 407 a retainer is formed, into which the guide rail of the electronics module 103 or 104 can be inserted. The attachment flange 407 and the projection 408 are essentially spaced apart from each other by the space 406.

When the guide rail 104 or 103 is coupled to the attachment device 402, the plane surfaces of the electronics module 201 and the plane surface of the electronics insert 401 come to rest flat against each other. By inserting the guide rails 103 or 104 of the electronics module in the gap 406 or in the retainer 406 the attachment flange 407 is lightly pressed away from the plane surface.

Due to the elastic properties of the plastic material from which the injection-moulded part 402 is made, the attachment flange 407 exerts pressure, by way of one of the guide rails 103 or 104, onto a lateral region of the electronics module 101. As a result of this pressure the plane surfaces 201 and 401 of the electronics module or of the electronics insert are pressed against each other, as a result of which the friction, in particular the adherence, of the surfaces 201, 401 against each other is increased. Increasing the friction causes a firm seat of the electronics module 101 on the electronics insert 404 in an installed or coupled state.

FIG. 5 shows a lateral view of an electronics insert arrangement according to an exemplary embodiment of the present invention. FIG. 5 shows the electronics insert 404 with an electronics module 101 in a coupled state. The electronics module with the guide rail 103 is snapped into attachment device 402. The plane surface 401 of the electronics insert 404 and the plane surface 201 of the electronics module rest flat against each other so that they are held against each other by means of frictional force.

FIG. 5 also shows the interface region 501 of the electronics insert 404. Furthermore, the interface 106 of the electronics module 101 is shown, including a connection line 105 that comprises a connector 502. By coupling the electronics module 101 to the electronics insert 404 the space between the interface 106 and a reference point of the interface region 501 remains constant during movement of the electronics insert arrangement 503 because the electronics module 101 follows the movement of the electronics insert 404. As a result of the constant space the connection cable 105 with the connector 502 can be inserted in one of the interfaces without movement of the electronics insert arrangement 503 exerting a force from the electronics module 101 on the connection line 105 and in particular on the connector 502, which force could cause the connector to disconnect from an interface of the interface region 501. However, in FIG. 5 the connector 502 is shown in a disconnected operating state.

The diagram also shows the EMC filter 504, installed in the electronics module 101, which EMC filter 504 ensures shielding of the electronics module 101, in particular of a component installed in the electronics module 101.

The electronics insert 404 comprises a measuring device infeed 505 by means of which a connection between measuring electronics situated in the electronics insert 404 and an associated measuring device (not shown in FIG. 5) can take place.

FIG. 6 shows a front view of an electronics insert arrangement according to an exemplary embodiment of the present invention, in an installed state. Again, the electronics insert 404 with the measuring device infeed 505 and the interface region 501 are shown. This frontal view also shows the individual interfaces 601, to which the connectors 602 or the bare wire 603 can be connected. Connection from the interfaces 601 to the interfaces 106 is by way of the connection lines 105. The diagram also shows that the electronics module 101 with the guide rails 103 or 104 is clamped into the attachment devices 402.

Below, the two attachment devices 402 will be examined more closely, whose design is symmetrical and consequently is described only once. These are injection-moulded parts that are provided for attaching the electronics insert 404 to a measuring device housing (not shown). Attachment to the measuring device housing is by means of the attachment screw 403 that is arranged in an attachment device comprising the perpendicular flange 405 and the attachment flange 407.

In frontal view the flanges 405 and 407 are frame-shaped, wherein the frame is interrupted by the gap 602. In this way the gap 602 separates two spring elements that are formed by the flanges 405 and 407. Thus, during insertion of the electronics module 101 behind the parallel attachment flange 407, the part of the frame of the attachment device 402, which part faces the electronics module 101, can be moved somewhat from the drawing plane so as to firmly clamp the attachment rail 103 or 104 into place by means of a restoring force. As a result of the restoring force generated during the excursion, the electronics module 101 is held to the electronics insert 404, and the distance between a previously determined interface 106 and a previously determined interface 601 remains constant even if the electronics insert 404 moves.

FIG. 7 shows a top view of an electronics insert arrangement according to an exemplary embodiment of the present invention. FIG. 7 shows that the electronics insert 404 is in part circular in shape, wherein the circular shape is interrupted by the plane surface 401 that is arranged chord-like in the circle described by the housing 404.

The electronics module 101 with the EMC filter 504 is squeezed in behind the attachment device 402. The attachment device 402 is provided for installation to a measuring device housing by means of a screw 403. Installation of the electronics module 101 does not impede access to the screws 403. In this arrangement the width of the plane surface 201 matches the space of the attachment devices 402. Parallel attachment to two attachment devices 402 improves the strength of the clamp-type connection. However, the electronics module 101 can easily be removed from the electronics insert 404 manually, i.e. without any tools. Installation without the use of tools can accelerate an installation or repair process.

Figure 8:
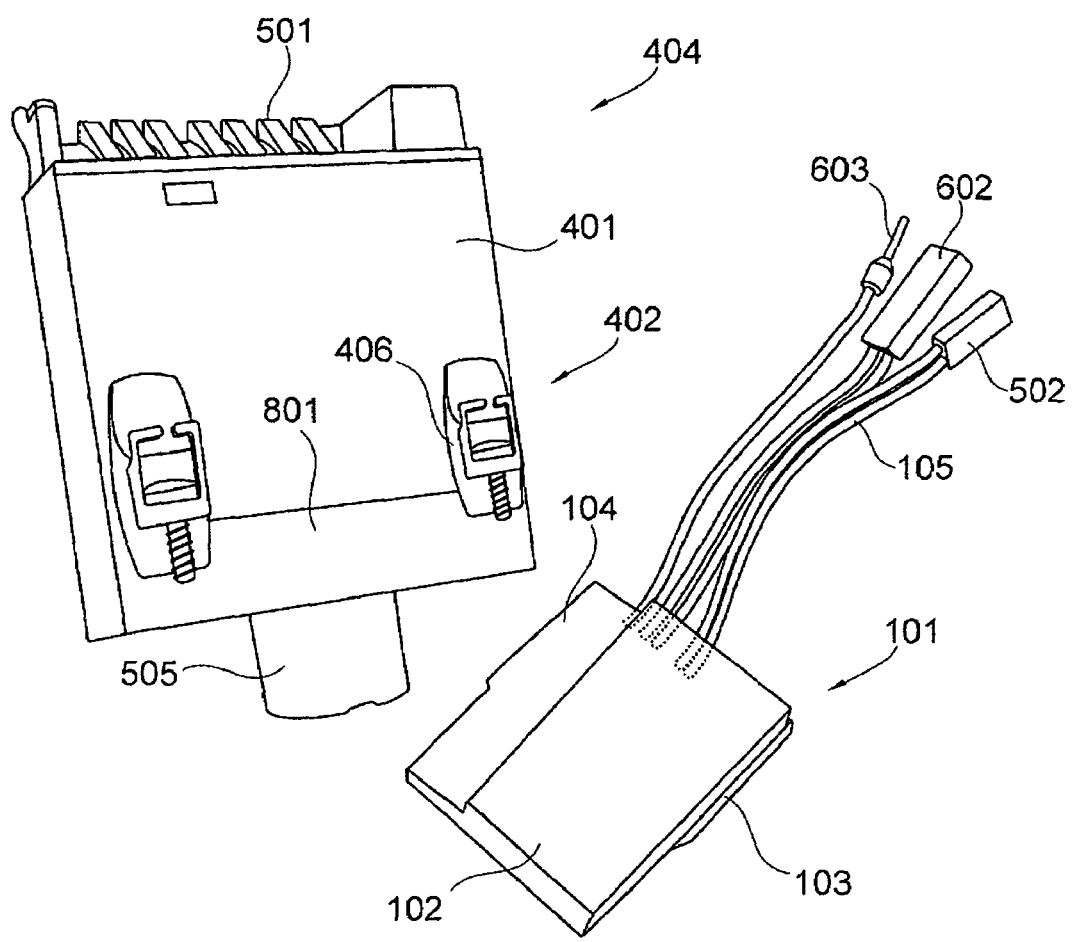
FIG. 8 shows a perspective view of an electronics insert arrangement in a decoupled operational state according to an exemplary embodiment of the present invention.

FIG. 8 shows a perspective view of an electronics insert arrangement in a decoupled operating state according to an exemplary embodiment of the present invention. FIG. 8 also shows the electronics module with the guide rails 103 and 104 with the electronics connection lines 105 and the associated connectors 502, 602 and 603. The connectors 502, 602 and 603 can be inserted in corresponding interfaces of the interface strip 501. The interfaces 501 can, for example, be designed for the supply of power or for a display connection or a monitor connection. Apart from this it is also possible to design the interfaces 601 of the interface region 501 as a control connection such as an I²C bus.

The electronics module 101 can be coupled to the electronics insert 404 in that the guide rails 104 or 103 are inserted in the retainers 406. FIG. 8 also shows that the measuring device leadthrough 505 comprises an elevation 801 that protrudes from the plane surface 401. In an installed state this elevation can lift the module body 102 of the electronics module 101 in the direction of the flange 407 and can thus increase the pressure of the guide rails 103 or 104 by means of the flange 407, as a result of which the friction and adherence can be still further improved.

Figure 9:
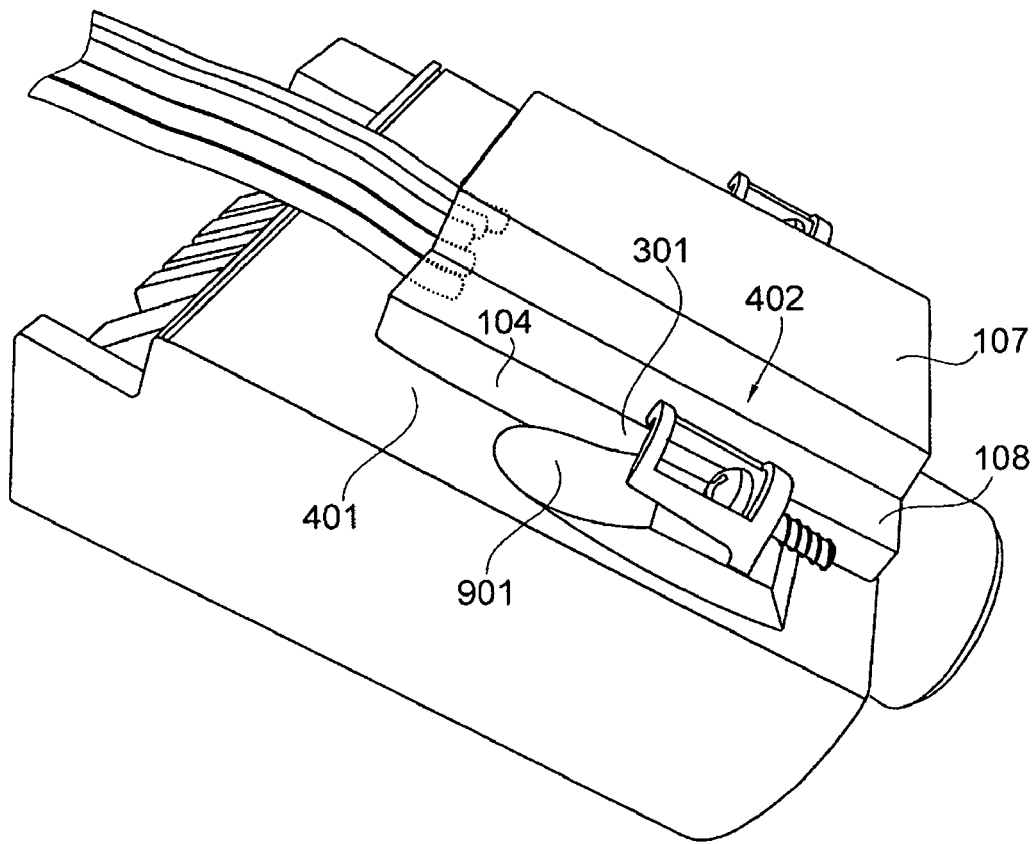
FIG. 9 shows a perspective view of an electronics insert arrangement in a coupled operational state according to an exemplary embodiment of the present invention.

FIG. 9 shows a perspective view of an electronics insert arrangement in a coupled operational state according to an exemplary embodiment of the present invention. FIG. 9 shows the different heights of the retainer of the electronics module bodies 107 and 108. The illustration also shows that the end region 301 of the guide rail 104 with its bottle shape matches an attachment structure 901, 408 of the attachment device 402. The form adaptation makes possible unimpeded insertion of the guide rail 402 into the guide 406.

Figure 10:
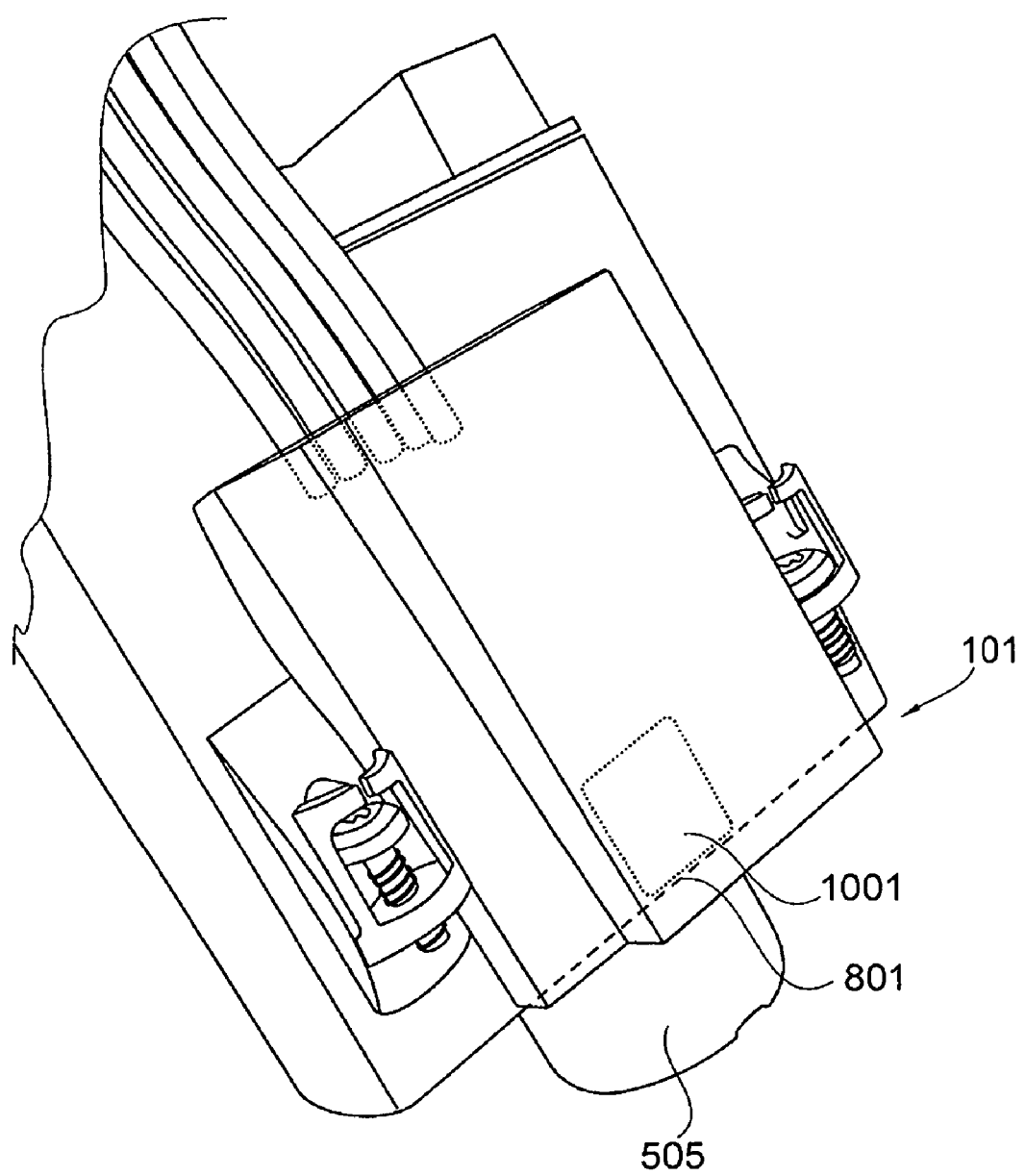
FIG. 10 shows a further perspective view of an electronics insert arrangement in a coupled operational state according to an exemplary embodiment of the present invention.

FIG. 10 shows a further perspective view of an electronics insert arrangement in an installed state. FIG. 10 shows that by means of the notch 1001 the shape of the housing of the electronics module 101 or the cast shape of the electronics module 101 on the side of the plane surface 201 matches the elevation 801 that is caused by the measuring device coupling 505. The notch 1001 has been made by the removal of material on the plane surface 201 of the electronics module 101. Due to materials removal the plane surface 201 is interrupted in the region of the notch.

Figure 11:
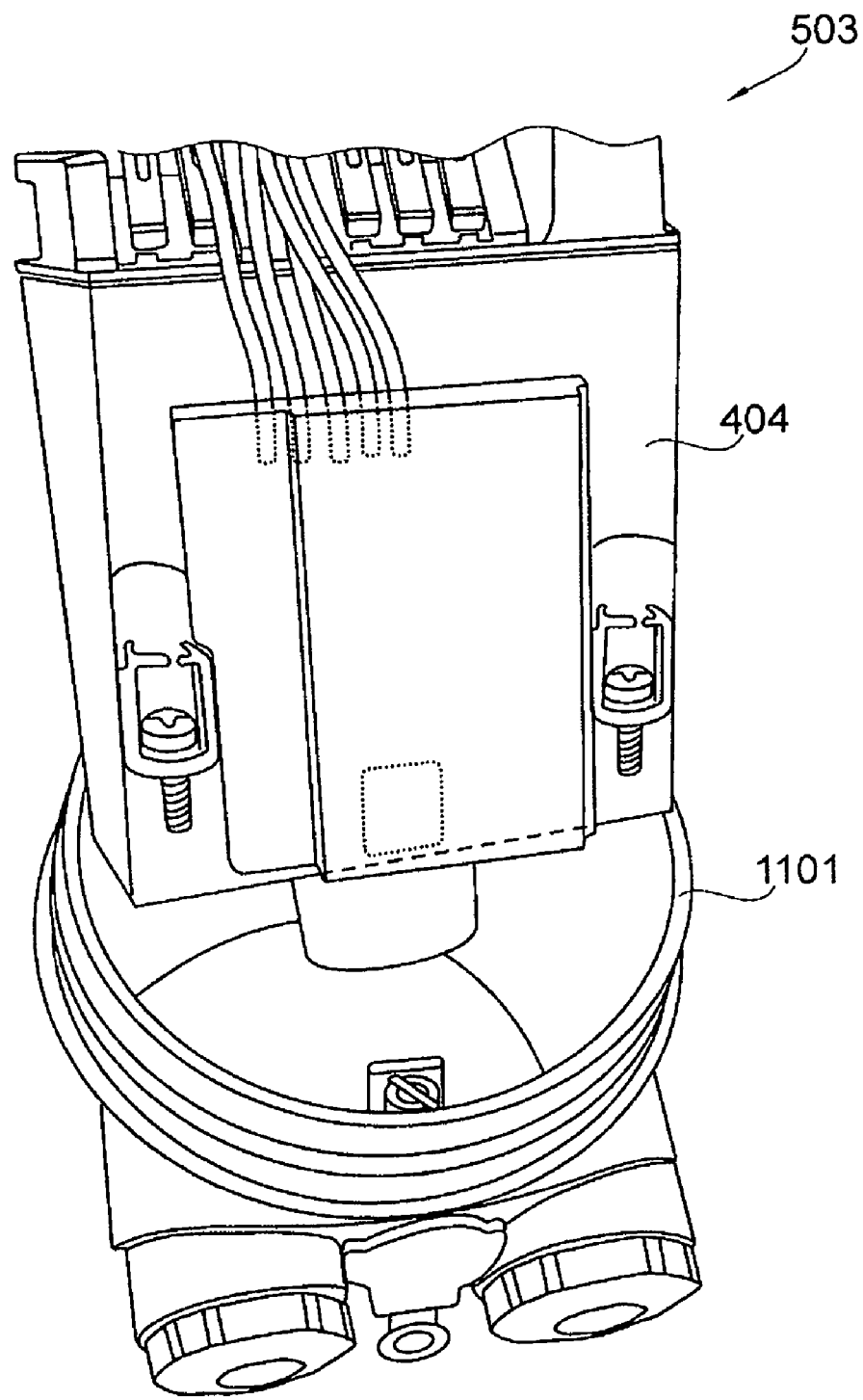
FIG. 11 shows a perspective view of an electronics insert arrangement in a coupled state with a measuring device housing according to an exemplary embodiment of the present invention.

FIG. 11 shows a perspective view of an electronics insert arrangement with a measuring device housing. The measuring device housing 1101 comprises a cylindrical shape into which the electronics insert arrangement 503 can be inserted due to the essentially cylindrical design of the electronics insert 404.

Figure 12:
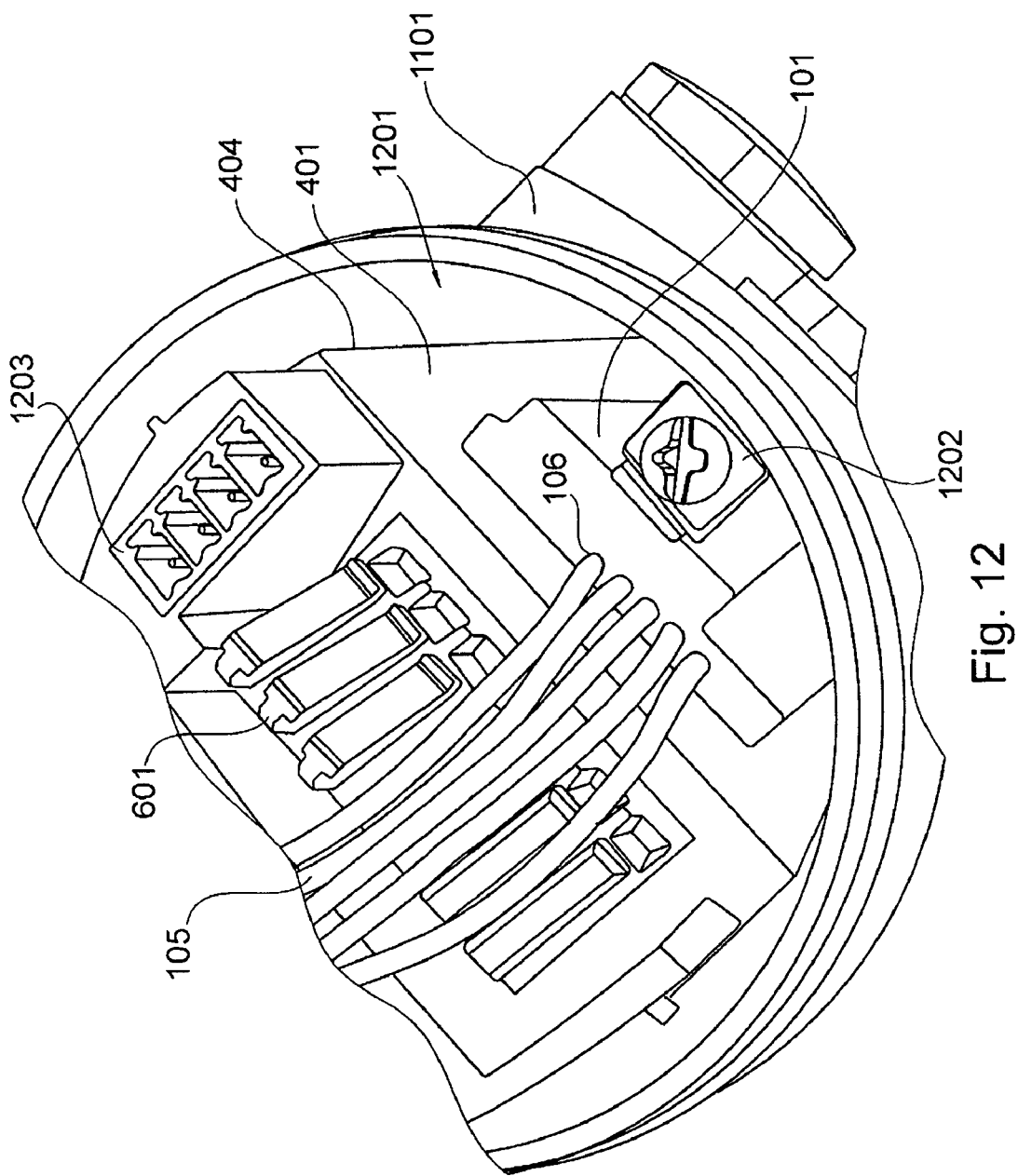
FIG. 12 shows a top view of an electronics insert arrangement in an installed state in a measuring device housing according to an exemplary embodiment of the present invention.

FIG. 12 shows a top view of an electronics insert arrangement in an installed state in a measuring device housing. FIG. 12 shows that due to the chord-like design of the plane surface 401 of the electronics insert 404 a void 1201 is formed in the interior of the measuring device housing 1101. This void 1201 can be used for accommodating the electronics module 101. To this effect the electronics module 101 is coupled to the electronics insert 404. Due to the fixed-position and vibration-resistant installation of the electronics module 101 on the electronics insert 404, the electronics module 101 cannot chafe against components, such as for example the grounding screw 1202, which components are additionally present in the measuring device housing.

During movement, in particular during shaking or jarring, of the measuring device housing 1101 or of the electronics insert 404, the interfaces 106 and 601 maintain an essentially constant space, as a result of which tension on the connection lines 105, due to the weight force of the electronics module 101, can be prevented. The distance between a particular interface 106 and the control interface 1203 also remains constant during movement.

A cover (not shown in FIG. 12) can close the measuring device housing 1101. In this way a compact arrangement of additional electronics within the measuring device 1101 is possible.

In addition it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An electronics insert arrangement for a measuring device housing, comprising:
    an electronics insert including a first attachment device and a first interface, the electronics insert being adapted to carry out processes of a first functionality; and
    an electronics module including a second attachment device and a second interface, the electronics module being adapted to carry out processes of a second functionality,
    wherein the first attachment device and the second attachment device couple the electronics module to the electronics insert by engaging each other so that a space between the first interface and the second interface remains essentially constant when the electronics insert moves,
    wherein the electronics insert includes a first plane surface, the electronics module including a second plane surface and wherein, in an operating state in which the first attachment device and the second attachment device are engaged, the first plane surface and the second plane surface come to rest against each other so as to be essentially flat.

2. The electronics insert arrangement of claim 1, wherein the movement is a vibration.

3. The electronics insert arrangement of claim 1, wherein the first attachment device and the second attachment device are engageable without the use of tools.

4. The electronics insert arrangement of claim 1, wherein the first attachment device and the second attachment device are designed as at least one connection selected from a group including a clamp-type connection and a snap-in connection.

5. The electronics insert arrangement of claim 1, wherein the first attachment device is designed as an injection-moulded retainer.

6. The electronics insert arrangement of claim 1, wherein the first attachment device is designed as a rail retainer, the second attachment device being designed as a guide rail, the guide rail engaging the rail retainer.

7. The electronics insert arrangement of claim 1, wherein the first attachment device is designed such that the electronics insert is attached to the measuring device housing using the first attachment device.

8. The electronics insert arrangement of claim 1, wherein the first attachment device is designed as a screw retainer.

9. The electronics insert arrangement of claim 1, wherein the electronics module is designed to accommodate an electronics print.

10. The electronics insert arrangement of claim 1, wherein the electronics module includes a housing.

11. The electronics insert arrangement of claim 1, wherein the electronics module is designed as a cast element.

12. The electronics insert arrangement of claim 1, wherein the electronics module includes an EMC filter.

13. The electronics insert arrangement of claim 1, wherein the electronics module further includes a connection line, and wherein the connection line is equipped to connect the first interface to the second interface.

14. The electronics insert arrangement of claim 1, wherein the electronics module is equipped to process a 4 to 20 mA signal.

15. The electronics insert arrangement of claim 1, wherein the electronics insert is equipped to carry out a measuring functionality.

16. The electronics insert arrangement of claim 1, wherein the electronics module is equipped to carry out a display functionality.

17. The electronics insert arrangement of claim 1, wherein the electronics module is equipped to carry out a heating functionality.

18. An electronics insert for a measuring device housing, comprising:
a first attachment device being equipped to be coupled to a second attachment device of an electronics module; and
a first interface, in a coupled state, being spaced apart from a second interface of the electronics module, the space between the first interface and the second interface remaining essentially constant during movement of the electronics insert,
wherein the electronics insert is equipped to carry out processes of a first functionality,
wherein the electronics insert includes a first plane surface, the electronics module including a second plane surface and wherein in an operating state in which the first attachment device and the second attachment device are engaged, the first plane surface and the second plane surface come to rest against each other so as to be essentially flat.

19. The electronics insert of claim 18, wherein the electronics insert is adapted to carry out a measuring functionality.

20. An electronics module for a measuring device housing, comprising:
a second attachment device adapted to be coupled to a first attachment device of an electronics insert; and
a second interface, in a coupled state, includes a space from a first interface of the electronics insert, the space between the second interface and the first interface remaining essentially constant during movement of the electronics insert,
wherein the electronics module is adapted to carry out processes of a second functionality,
wherein the electronics insert includes a first plane surface, the electronics module including a second plane surface and wherein, in an operating state in which the first attachment device and the second attachment device are engaged, the first plane surface and the second plane surface come to rest against each other so as to be essentially flat.

21. The electronics module of claim 20, wherein the second attachment device is designed as a guide rail.

22. The electronics module of claim 20, wherein the electronics module is designed to accommodate an electronics print.

23. The electronics module of claim 20, wherein the electronics module includes a housing.

24. The electronics module of claim 20, wherein the electronics module is a cast element.

25. The electronics module of claim 20, further comprising:
a connection line being designed to connect the first interface to the second interface.

26. The electronics module of claim 20, wherein the electronics module is equipped to carry out a display functionality.

27. The electronics module of claim 20, wherein the electronics module is equipped to carry out a heating functionality.

28. The electronics module of claim 20, wherein the electronics module is equipped to process 4 to 20 mA signals.

29. A measuring device, comprising:
a measuring device housing; and
an electronics insert arrangement comprising:
an electronics insert including a first attachment device and a first interface, the electronics insert being adapted to carry out processes of a first functionality; and
an electronics module including a second attachment device and a second interface, the electronics module being adapted to carry out processes of a second functionality,
wherein the first attachment device and the second attachment device couple the electronics module to the electronics insert by engaging each other so that a space between the first interface and the second interface remains essentially constant when the electronics insert moves,
wherein the electronics insert includes a first plane surface, the electronics module including a second plane surface and wherein, in an operating state in which the first attachment device and the second attachment device are engaged, the first plane surface and the second plane surface come to rest against each other so as to be essentially flat.

30. The measuring device of claim 29, wherein the measuring device is one of a pressure measuring device and a fill level measuring device.

* * * * *